Figure 1:
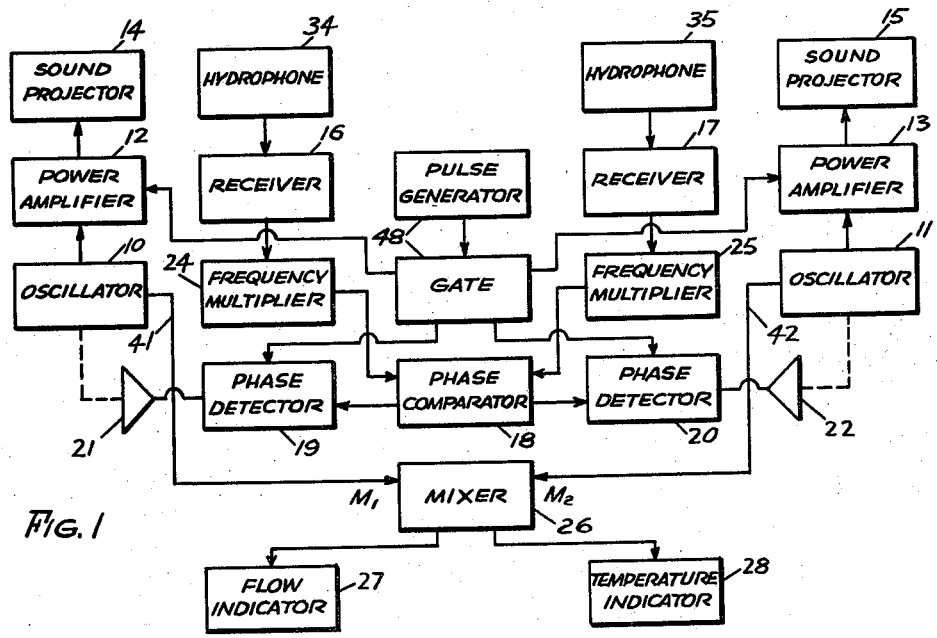

Aug. 23, 1960

L. BATCHELDER 2,949,773

MEASUREMENT OF RELATIVE VELOCITY
BETWEEN FLUID AND SOLID BODIES

Filed Jan. 20, 1955

INVENTOR
LAURENCE BATCHELDER
BY Elmer J. Gorn
ATTORNEY

United States Patent Office 2,949,773
Patented Aug. 23, 1960

2,949,773

MEASUREMENT OF RELATIVE VELOCITY BETWEEN FLUID AND SOLID BODIES

Laurence Batchelder, Cambridge, Mass., assignor to Raytheon Company, a corporation of Delaware Filed Jan. 20, 1955, Ser. No. 483,012

3 Claims. (Cl. 73—194)

This invention relates to the measurement of motion, and particularly to the measurement of the rate of relative motion as between fluid and solid bodies as, for example, the rate of flow of fluid along a fluid conduit or water-way, or the rate of motion of a craft through a body of water or air.

The invention consists in measuring such rate of relative motion by the use of measuring means operated by the frequency difference between two oscillating electrical energy outputs, which frequency difference is in turn a reflection of the phase difference prevailing at two points of pick-up of sound wave energy projected into a fluid stream, the sound detector devices (hydrophones or the equivalent) being disposed along a path of relative motion whose rate is to be measured, and the sound wave energy being projected toward said sound detectors from opposite directions alternately.

More specifically, the invention includes a combination of two sound wave projectors and two sound wave detectors, the latter being disposed at points lying within the space embraced by said projectors, and in a region of uniform relative motion whose linear extent ($d$) is a known multiple ($n$) of the wave length ($\lambda$) of the projected sound waves, so that a known datum for phase comparison is established at the points of installation of said sound wave detectors.

The sound wave projectors referred to may be electroacoustic transducers receiving electrical energy from two distinct oscillation generators, one of the transducers operating to convert its received electrical energy to a sound wave for "upstream" propagation, the other converting its received electrical energy to a sound wave for "downstream" propagation, and the two propagating actions being effected in alternating time sequence.

By using two distinct electrical energy sources, and by causing their respective outputs to differ in frequency by an amount ($f_1$—$f_2$) which is automatically adjusted to bear a constant ratio to the sought velocity, it becomes possible to have a continuing measure of the instantaneous value of the sought velocity, as by calibrating a frequency meter to read directly in terms of rate of relative motion. In such an installation the value "$v$" (representing rate of relative motion) will be readable on the frequency meter, and will be constituted as follows:

$$v = \frac{d}{2n}(f_1 - f_2) \quad (1)$$

where $d$ represents the distance between the two sound detecting hydrophones, $n$ is the number of wave lengths embraced in such distance, and $f_1$ and $f_2$ the two controlling frequencies. There is thus obtained a direct measurement of relative motion velocity ($v$) in terms of frequency difference solely, with the indeterminable variable factor "$c$" (sound propagation velocity) eliminated from the calculation (as hereinafter more fully demonstrated) by the self-canceling effect of its oppositely-acting influence upon the two oppositely directed (upstream and downstream) frequencies $f_2$ and $f_1$, respectively.

Figure 2:
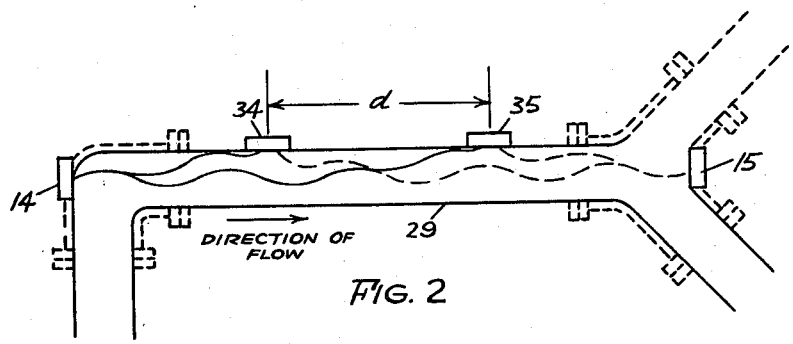
Figure 3:
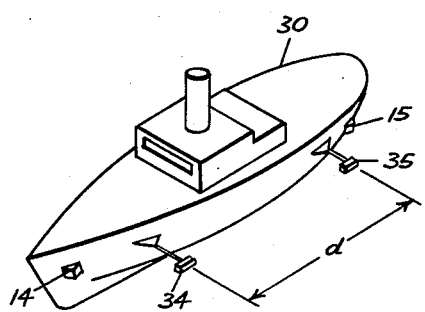

In the drawing:

Fig. 1 is a block diagram of the components and interconnections entering into an embodiment of the invention; and Figs. 2 and 3 illustrate physical relationships that may obtain between certain of the components of Fig. 1, in differing types of installations.

Referring first to Fig. 1, this illustrated arrangement includes a pair of oscillation generators 10 and 11, a pair of power amplifiers 12 and 13, a pair of sound projecting transducers 14 and 15, a pair of sound pick-up devices (hydrophones) 34 and 35, a pair of units 16 and 17 to receive the signal energy generated in hydrophones 34 and 35, respectively, a trio of signal phase comparing and detecting units 18, 19 and 20, a pair of restoring ("follow-up") units 21 and 22, a pair of frequency multipliers 24 and 25, a mixer unit 26, a flow indicator unit 27, and a temperature indicator unit 28. If the flow conduit 29 (Fig. 2) is of curved or sinuous contour, as indicated, a distance "$d$" of relatively straight contour, and uniform flow characteristics, is selected for installation of the two hydrophones 34 and 35, and these are mounted in a manner such that any obstructing or flow altering effects created thereby will be substantially equal. The hydrophone relationship is such that a known phase relationship is established therebetween, to eliminate the possibility of creating a spurious frequency difference signal that would have its origin in phase mismatching, rather than in an actual change in the fluid flow velocity ($v$). The positioning and phase relationships of the sound projecting transducers 14 and 15, on the other hand, is not critical. They may, accordingly, be located where most convenient for practical reasons. The only conditions to be met are that they be in "upstream" and "downstream" locations, respectively, in relation to the space "$d$" embraced by the two hydrophones 34 and 35, and that they be so positioned as to direct their respective sound outputs into the fluid stream. The mounting positions shown for projectors 14 and 15 in Fig. 2 meet these requirements, but since the "elbow" or Y fittings on which they might be installed constitute points of turbulent or erratic flow, these points would not be suitable for mounting hydrophones 34 and 35.

Oscillators 10 and 11 will be adjusted initially to deliver oscillating energy at frequencies $f_1$ and $f_2$, respectively, which frequencies are chosen by solving the following equations:

$$f_1 = \frac{n(c+v)}{d} \quad (2)$$

$$f_2 = \frac{n(c-v)}{d} \quad (3)$$

representing "downstream" and "upstream" transmission, respectively. In these equations the sound and flow velocity values "$c$" and "$v$" will be chosen to fall within known practical limits; the value "$d$" will be the physical spacing of the two hydrophones 34 and 35, and the value "$n$" will be the arbitrarily chosen number of wave lengths to be embraced within the distance "$d$," as heretofore indicated.

Having obtained, by solution of the foregoing equations, the desirable frequency values for generation in oscillators 10 and 11, respectively, the outputs of said units 10 and 11 are amplified in units 12 and 13, respectively, then supplied to transducers 14 and 15, respectively, wherein they are converted to sound energy which is then propagated in opposite directions, alternately (under the control of interval-establishing gating means 48), through the fluid medium flowing in conduit 29. The sound waves thus propagated will be picked up in alternately reversing sequence by hydrophones 34 and 35, that is, the downstream sound propagation (indicated in solid wavy lines in Fig. 2) will arrive at hydrophone 34 first, then at hydrophone 35 whereas the upstream sound waves (indicated in broken wavy lines in Fig. 2) will arrive at sound receiver 35 first, then at receiver 34. As the rate of relative motion (fluid flow, in the case illustrated in Fig. 2) undergoes variation, there will be variation in the degree of phase displacement occurring in the time interval required for the sound to traverse the distance "$d$," in each direction, and this phase displacement will be reflected in a corresponding phase displacement in the electrical outputs of hydrophones 34 and 35, as said outputs are delivered to receivers 16 and 17, respectively, during each of the successive time intervals, which time intervals occur at a repetition rate controlled by the timing pulses delivered through gate 48, and applied alternately to units 12 and 13. Thus the gated pulses cause alternate operation of the projectors 14 and 15, and corresponding alternation in the application of phase displacement signals (if flow rate variation has occurred) to the receivers 16 and 17.

From receivers 16 and 17 the phase-asynchronized signal energy is conducted (by way of frequency multipliers 24, 25) to phase comparator 18, and the phase differences revealed by such phase comparison, in unit 18, are converted into D.C. signal voltages in phase detectors 19 and 20, operating in sequence, in accordance with the sequence of gated pulse transmission along the two conductors leading from gate 48 to the detector units 19 and 20. Output voltages are thus developed in phase detectors 19 and 20 in an alternating sequence conforming to the sequence of operation of projectors 14 and 15, under the control of the impulses supplied by gate 48 to units 19 and 20 in such sequence. The developed voltages are applied to restoring units 21 and 22, respectively (which may be servo-amplifiers or equivalent follow-up devices) where they will be operative to produce adjusting signals (electrical or mechanical) for application to the associated oscillators 10 and 11, to restore said oscillators to their respective frequency settings ($f_1$ and $f_2$, respectively) that will re-establish phase-matching at points 34, 35. At the same time the outputs of oscillators 10 and 11 are supplied to mixer 26, as mixer inputs $M_1$ and $M_2$. The difference between said inputs $M_1$ and $M_2$ will produce in said mixer a signal voltage that will be a direct measure of the frequency difference $f_1-f_2$, hence the mixer output, as read on indicator 27, will indicate the fluid flow velocity, in accordance with the equation:

$$v = \frac{d}{2n}(f_1-f_2) \qquad (4)$$

said equation being derived from Equations 2 and 3, which equations when their terms are subtracted, one from the other, provide the following relationship:

$$f_1-f_2 = \frac{2nv}{d} \qquad (5)$$

from which relationship the value of "$v$," set out in Equation 4, is obtained.

Mixer unit 26, in addition to yielding the difference frequency $f_1-f_2$, proportional to and therefore indicative of flow velocity or relative motion velocity, may be of a known type capable of also yielding the summation frequency, $f_1+f_2$, which is proportional to the propagation velocity "$c$." Therefore, once the relationship between "$c$" and temperature is known, the said sum $f_1+f_2$ will be indicative of the instantaneous temperature of the fluid flowing in the conduit 29, or the fluid adjacent the moving craft 30 of Fig. 3, in accordance with the following formula (representing the sum of Equations 2 and 3):

$$f_1+f_2 = \frac{2nc}{d} \qquad (6)$$

wherein the sound propagation velocity term "$c$," as heretofore noted, is variable as a function of the temperature of the fluid through which the sound is being directed. Accordingly, frequency counter 28, registering the sum $f_1+f_2$, can be calibrated in degrees of temperature. In Formula 6 the terms $n$, $d$, $f_1$ and $f_2$ have the significance heretofore indicated.

When the rate of flow to be measured is the entire flow in a river, harbor channel, or other water-way, sound receiving hydrophones 34, 35 will occupy spaced points along the banks, floor, or other fixed points of uniform flow, and sound projectors 14, 15 will be fixed to points beyond the respective points 34, 35 in each direction. Alternatively, when the invention is applied to the measurement of the speed of an aircraft or vessel, such as the vessel indicated at 30 in Fig. 3, the sound projecting and receiving units may be carried on the exterior of the craft, as indicated at 14, 15, 34 and 35 in Fig. 3, with the hydrophones 34 and 35 being preferably extended beyond the inboard region of less uniform flow, as by use of outwardly projecting struts, as shown.

As used herein the term "fluid" includes air and all other gases, whether "dry" or liquid-bearing, as well as all liquids and the term "conduit" includes all channels, canals, rivers and other flow directing formations.

This invention is not limited to the particular details of construction, or to the combinations and relationships, described, as many equivalents will suggest themselves to those skilled in the art. It is accordingly desired that the appended claims be accorded a broad interpretation commensurate with the scope of the invention, and the degree to which it advances the art.

What is claimed is:

1. Apparatus for measuring the physical characteristics of a fluid in motion relative to said apparatus comprising two spaced sources of acoustic wave energy, an independent frequency variable oscillation generator connected to each of said sources for varying the frequency of said acoustic wave energy, gating means for causing said sources to alternately transmit acoustic wave energy into said fluid, acoustic energy receivers disposed between said sources at two locations for generating electrical signals indicative of the acoustic energy impinging thereon, a phase comparator coupled to said receivers and responsive to said electrical signals for producing an output signal representing the phase displacement of the acoustic wave energy impinging on said receivers, gated means responsive to the output of said phase comparator for developing control signals, means responsive to said control signals and coupled to each of said oscillation generators for maintaining a fixed phase displacement of the acoustic wave energy impinging on said receivers, means coupled to said oscillation generators for producing a resultant frequency which is the algebraic summation of the frequencies generated by said oscillation generators, and a frequency responsive indicator responsive to said resultant frequency.

2. Apparatus as defined in claim 1, wherein said last-named means produces a resultant frequency which is the difference of the frequencies generated by said oscillation generators.

3. Apparatus as defined in claim 1, wherein said last-named means produces a resultant frequency which is the sum of the frequencies generated by said oscillation generators, and said frequency responsive indicator is calibrated in degrees of temperature.

References Cited in the file of this patent

UNITED STATES PATENTS

| | | |
|---|---|---|
| 1,881,543 | Hartig et al. | Oct. 11, 1932 |
| 2,480,646 | Grabau | Aug. 30, 1949 |
| 2,669,129 | Garman et al. | Feb. 16, 1954 |
| 2,826,912 | Kritz | Mar. 18, 1958 |

FOREIGN PATENTS

| | | |
|---|---|---|
| 574,819 | Great Britain | Jan. 22, 1946 |